(12) United States Patent
Tedford, Jr. et al.

(10) Patent No.: US 7,678,444 B2
(45) Date of Patent: Mar. 16, 2010

(54) THERMOFORMED ARTICLE MADE FROM RENEWABLE POLYMER AND HEAT-RESISTANT POLYMER

(75) Inventors: Richard A. Tedford, Jr., Loveland, OH (US); Wei Li, Mason, OH (US)

(73) Assignee: International Paper Company, Memphis, TN (US)

(*) Notice: Subject to any disclaimer, the term of this patent is extended or adjusted under 35 U.S.C. 154(b) by 0 days.

(21) Appl. No.: 12/002,495

(22) Filed: Dec. 17, 2007

(65) Prior Publication Data

US 2009/0155611 A1  Jun. 18, 2009

(51) Int. Cl.
B32B 7/02 (2006.01)
B32B 27/30 (2006.01)
B32B 27/32 (2006.01)
B32B 27/34 (2006.01)
B32B 27/36 (2006.01)

(52) U.S. Cl. .......... 428/212; 428/423.1; 428/423.7; 428/474.4; 428/475.2; 428/480; 428/481; 428/483; 428/500; 428/515; 428/523; 428/532; 264/173.11; 264/173.12; 264/173.14; 264/173.15; 264/173.16; 264/173.17; 264/173.19

(58) Field of Classification Search .......... None
See application file for complete search history.

(56) References Cited

U.S. PATENT DOCUMENTS

| | | | |
|---|---|---|---|
| 4,111,349 A | | 9/1978 | Buckler et al. |
| 4,826,723 A | * | 5/1989 | Brambach ............ 442/221 |
| 5,348,983 A | * | 9/1994 | Sterzel ................ 521/54 |
| 5,358,785 A | * | 10/1994 | Akao et al. ............ 428/349 |
| 5,391,423 A | * | 2/1995 | Wnuk et al. ........... 428/217 |
| 5,449,708 A | | 9/1995 | Schiltz |
| 5,589,518 A | * | 12/1996 | Bastioli et al. .......... 521/55 |
| 5,698,612 A | | 12/1997 | Simon et al. |
| 5,703,160 A | | 12/1997 | Dehennau et al. |

(Continued)

FOREIGN PATENT DOCUMENTS

JP  9-111107  4/1997

(Continued)

OTHER PUBLICATIONS

Schimtz, Peter et al., "Films." Ullmann'S Encyclopedia of Industrial Chemistry, 5th Ed., vol. All (1988), pp. 85-95, 105-106, 108-110.*

*Primary Examiner*—Vivian Chen
(74) *Attorney, Agent, or Firm*—Matthew M. Eslami; Eric W. Guttag

(57) ABSTRACT

The present invention provides articles comprising a thermoformable composite comprising: a core comprising a renewable polymer having: (a) a $T_s$ value of up to about 90° C.; and (b) a heat distortion index of up to about 90° C.; and a heat-resistant outer layer substantially surrounding the core and comprising a heat-resistant polymer having: (a) a $T_s$ of greater than about 60° C.; and (b) a heat distortion index of greater than about 50° C.; wherein the renewable polymer comprises at least about 60% by weight of the composite, and wherein the heat-resistant polymer has a $T_s$ value and heat distortion index greater than that of the renewable polymer. The present invention also provides methods for coextruding the heat-resistant polymer outer layer and renewable polymer core to provide a thermoformable composite.

38 Claims, 2 Drawing Sheets

U.S. PATENT DOCUMENTS

| | | | |
|---|---|---|---|
| 5,804,020 A * | 9/1998 | Akao et al. ................. 156/251 |
| 5,817,721 A | 10/1998 | Warzelhan et al. |
| 5,849,401 A * | 12/1998 | El-Afandi et al. ........... 428/215 |
| 6,011,092 A * | 1/2000 | Seppala et al. ................. 524/47 |
| 6,025,417 A | 2/2000 | Willett et al. |
| 6,080,478 A | 6/2000 | Karhuketo |
| 6,117,925 A | 9/2000 | Tomka |
| 6,124,384 A | 9/2000 | Shiraishi et al. |
| 6,153,276 A | 11/2000 | Oya et al. |
| 6,156,929 A * | 12/2000 | Chandler et al. ............. 562/582 |
| 6,191,203 B1 | 2/2001 | Asrar et al. |
| 6,211,325 B1 * | 4/2001 | Sun et al. ...................... 528/66 |
| 6,326,440 B1 | 12/2001 | Terada et al. |
| 6,346,599 B1 | 2/2002 | Goldberg et al. |
| 6,372,440 B2 | 4/2002 | Wells |
| 6,458,858 B1 | 10/2002 | Braun et al. |
| 6,573,340 B1 | 6/2003 | Khemani et al. |
| 6,632,923 B1 | 10/2003 | Lees et al. |
| 7,015,269 B1 | 3/2006 | Grutke et al. |
| 7,025,908 B1 | 4/2006 | Hayashi et al. |
| 7,087,313 B2 | 8/2006 | Sawai et al. |
| 7,132,490 B2 | 11/2006 | Obuchi et al. |
| 7,160,977 B2 | 1/2007 | Hale et al. |
| 7,173,744 B1 | 2/2007 | Whiteside et al. |
| 7,176,349 B1 | 2/2007 | Dhugga et al. |
| 7,208,535 B2 | 4/2007 | Asrar et al. |
| 7,235,287 B2 * | 6/2007 | Egawa ........................ 428/212 |
| 7,256,223 B2 | 8/2007 | Mohanty et al. |
| 7,267,794 B2 | 9/2007 | Amick |
| 7,276,361 B2 | 10/2007 | Doi et al. |
| 7,332,214 B2 * | 2/2008 | Ozasa et al. ............. 428/317.1 |
| 2002/0198332 A1 | 12/2002 | Kasemura et al. |
| 2003/0038405 A1 | 2/2003 | Bopp et al. |
| 2003/0051981 A1 | 3/2003 | Trieb |
| 2003/0166748 A1 | 9/2003 | Khemani et al. |
| 2005/0090625 A1 | 4/2005 | Bastioli et al. |
| 2005/0244606 A1 | 11/2005 | Egawa |
| 2006/0036062 A1 | 2/2006 | Ramakrishna et al. |
| 2006/0040119 A1 | 2/2006 | Egawa |
| 2006/0100395 A1 | 5/2006 | Aritake |
| 2006/0160984 A1 | 7/2006 | Nagasawa et al. |
| 2006/0269710 A1 | 11/2006 | Inglis |
| 2007/0092712 A1 * | 4/2007 | Hodson ................... 428/304.4 |
| 2007/0092745 A1 | 4/2007 | Nie et al. |
| 2007/0129467 A1 | 6/2007 | Scheer |
| 2007/0148384 A1 | 6/2007 | Bowden et al. |
| 2009/0274920 A1 * | 11/2009 | Li et al. ...................... 428/481 |

FOREIGN PATENT DOCUMENTS

| | | |
|---|---|---|
| JP | 2001-347623 | 12/2001 |
| JP | 2003-291294 | * 10/2003 |
| JP | 2005-119062 | * 5/2005 |
| JP | 2005-119061 | 12/2005 |
| JP | 2005-119062 | 12/2005 |
| JP | 2006-057197 | 2/2006 |
| JP | 2006-169430 | 6/2006 |
| WO | WO/ 98/20073 | 5/1998 |
| WO | WO/ 03/051981 | 6/2003 |

* cited by examiner

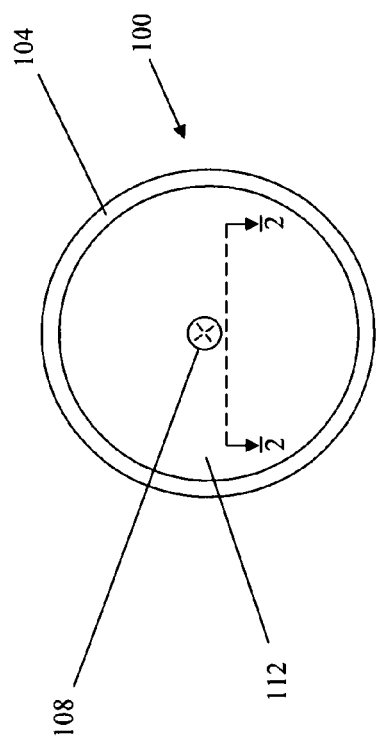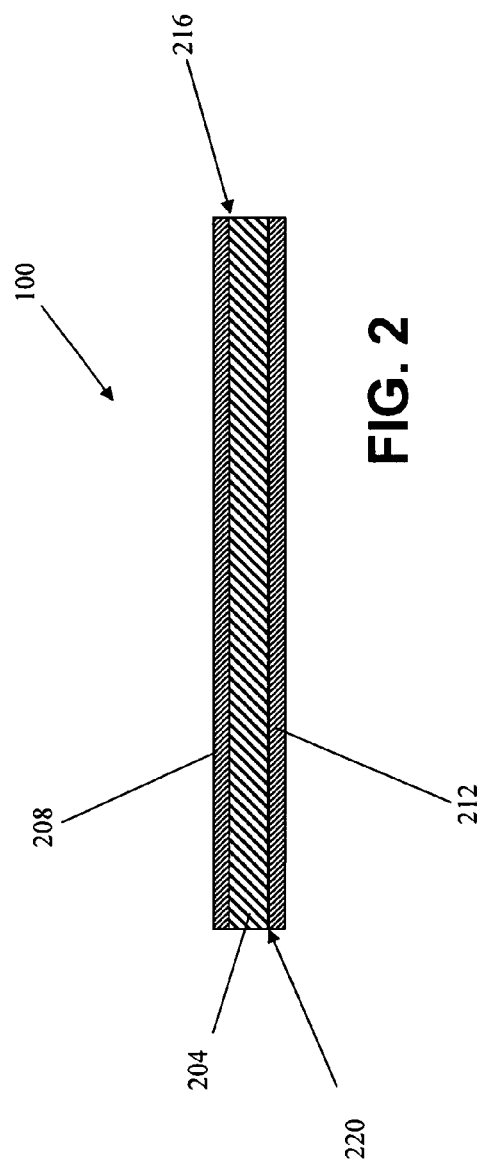

THERMOFORMED ARTICLE MADE FROM RENEWABLE POLYMER AND HEAT-RESISTANT POLYMER

BACKGROUND

1. Field of the Invention

The present invention broadly relates to articles comprising a thermoformable composite comprising a core comprising a renewable polymer and a heat-resistant outer layer substantially surrounding the core and comprising a heat-resistant polymer. The present invention also relates to a method for coextruding the heat-resistant polymer outer layer and renewable polymer core to provide the thermoformable composite.

2. Related Art

Polylactic acid (PLA) is increasing in favor with consumers of plastic thermoformed articles as a renewable plastic which does not derive from fossil fuels and which is degradable in the environment. As with many thermoplastics, PLA has a decreasing mechanical strength with increasing temperature. At higher temperatures approaching about 140° F. (60° C.), an article formed from PLA may lose the ability to resist deformation by forces frequently found in transportation. At temperatures above about 140° F. (60° C.), PLA may lose its ability to resist deformation to forces of the order of magnitude of gravity and residual mold stress. Prolonged exposure of PLA articles to temperatures of about 140° F. (60° C.) or higher may cause these articles to deform substantially from their original shape under forces which may be present in storage conditions. Since temperatures of about 130° F. (54.4° C.) may be exceeded in railcars and trailers used for distribution, PLA articles may suffer from high damage losses during transport through and storage in hot areas such as tractor trailers crossing, for example, the sunny warmer portions of the United States during the summer.

Accordingly, it would be desirable to develop PLA-containing articles which have greater resistance to deformation at higher temperatures that may occur during, for example, storage and transportation in warmer, summer time periods.

SUMMARY

According to a first broad aspect of the present invention, there is provided an article comprising a thermoformable composite comprising:
  a core comprising a renewable polymer having: (a) a $T_s$ value of up to about 90° C.; and (b) a heat distortion index of up to about 90° C.; and
  a heat-resistant outer layer substantially surrounding the core and comprising a heat-resistant polymer having: (a) a $T_s$ value of greater than about 60° C.; and (b) a heat distortion index of greater than about 50° C.;
  wherein the renewable polymer comprises at least about 60% by weight of the composite;
  wherein the heat-resistant polymer has a $T_s$ value and heat distortion index greater than that of the renewable polymer.

According to a second broad aspect of the present invention, there is provided a method comprising the following steps of:
  (1) providing a renewable polymer having: (a) a $T_s$ value of up to about 90° C.; and (a) a heat distortion index of up to about 90° C.;
  (2) providing a heat-resistant polymer having: (a) a $T_s$ of greater than about 60° C.; and (b) a heat distortion index greater than about 50° C., wherein the $T_s$ value and heat distortion index of the heat-resistant polymer is greater than that of the renewable polymer; and
  (3) coextruding the heat-resistant polymer and the renewable polymer to provide a thermoformable composite comprising:
    a core comprising the renewable polymer, wherein the renewable polymer comprises at least about 60% by weight of the composite; and
    a heat-resistant outer layer comprising the heat-resistant polymer which substantially surrounds the core.

BRIEF DESCRIPTION OF THE DRAWINGS

The invention will be described in conjunction with the accompanying drawings, in which:

FIG. 1 is a top plan view of an embodiment of an article comprising a thermoformable composite according to the present invention;

FIG. 2 is a sectional view taken along line 2-2 of FIG. 1; and

DETAILED DESCRIPTION

Figure 3:
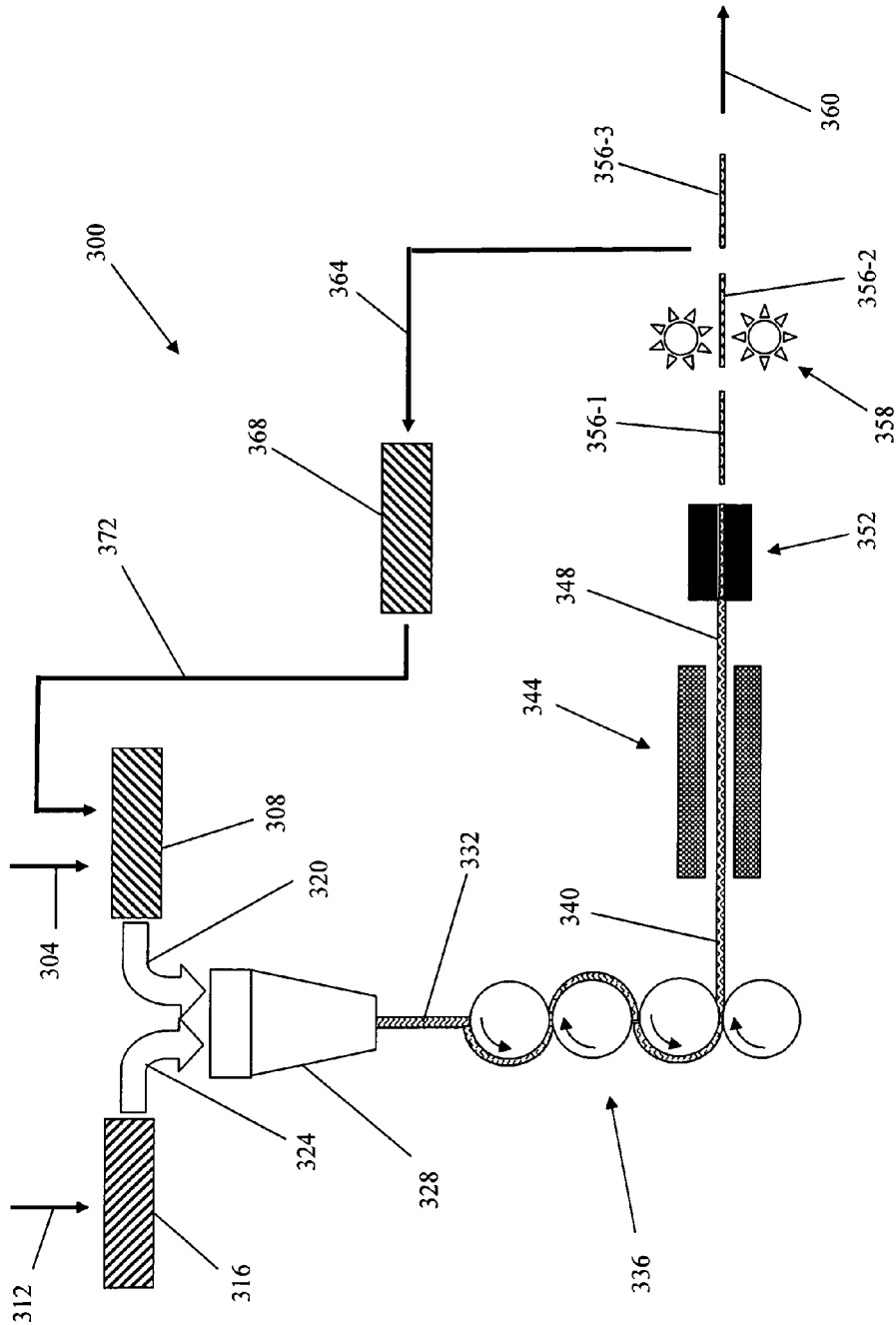
FIG. 3 is a schematic diagram illustrating an embodiment of a method for preparing an article comprising a thermoformable composite according to the present invention.

It is advantageous to define several terms before describing the invention. It should be appreciated that the following definitions are used throughout this application.

Definitions

Where the definition of terms departs from the commonly used meaning of the term, applicant intends to utilize the definitions provides below, unless specifically indicated.

For the purposes of the present invention, the term "renewable polymer" (also known as "biopolymer") refers to a polymer, or a combination (e.g., blend, mixture, etc.) of polymers, which may be obtained from renewable natural resources, e.g., from raw or starting materials which are or may be replenished within a few years (versus, for example, petroleum which requires thousands or millions of years). For example, a renewable polymer may include a polymer that may be obtained from renewable monomers, polymers which may be obtained from renewable natural sources (e.g., starch, sugars, lipids, corn, sugar beet, wheat, other, starch-rich products etc.) by, for example, enzymatic processes, bacterial fermentation, other processes which convert biological materials into a feedstock or into the final renewable polymer, etc. See, for example, U.S. Pat. App. No. 20060036062 (Ramakrishna et al.), published Feb. 16, 2006, the entire disclosure and contents of which is hereby incorporated by reference. Renewable polymers useful in embodiments of the present invention may include polyhydroxyalkanoate polymers, polycaprolactone (PCL) polymers, starch-based polymers, cellulose-based polymers, etc., or combinations thereof. Renewable polymers may, but do not necessarily include, biodegradable polymers.

For the purposes of the present invention, the term "biodegradable polymer" refers to a polymer which may be broken down into organic substances by living organisms, for example, microorganisms.

For the purposes of the present invention, the term "amorphous" refers to a solid which is not crystalline, i.e., has no lattice structure which is characteristic of a crystalline state.

For the purposes of the present invention, the term "crystalline" refers to a solid which has a lattice structure which is characteristic of a crystalline state.

For the purposes of the present invention, the term "high temperature deformation-resistant material" refers to a material which resists deformation at a temperature of about 140° F. (60° C.) or higher, for example, about 150° F. (65.6° C.) or higher.

For the purposes of the present invention, the term "high temperature deformable material" refers to a material which deforms at a temperature of less than about 140° F. (60° C.), for example, less than about 130° F. (54.4° C.).

For the purposes of the present invention, the term "thermoforming" refers to a method for preparing a shaped, formed, etc., article from a thermoplastic sheet, film, etc. In thermoforming, the sheet, film, etc., may be heated to its melting or softening point, stretched over or into a temperature-controlled, single-surface mold and then held against the mold surface until cooled (solidified). The formed article may then be trimmed from the thermoformed sheet. The trimmed material may be reground, mixed with virgin plastic, and reprocessed into usable sheet. Thermoforming may include vacuum forming, pressure forming, twin-sheet forming, drape forming, free blowing, simple sheet bending, etc.

For the purposes of the present invention, the term "thermoform" and similar terms such as, for example "thermoformed," etc., refers to articles made by a thermoforming method.

For the purposes of the present invention, the term "melting point" refers to the temperature range at which a crystalline material changes state from a solid to a liquid, e.g., may be molten. While the melting point of material may be a specific temperature, it often refers to the melting of a crystalline material over a temperature range of, for example, a few degrees or less. At the melting point, the solid and liquid phase of the material often exist in equilibrium.

For the purposes of the present invention, the term "$T_m$" refers to the melting temperature of a material, for example, a polymer. The melting temperature is often a temperature range at which the material changes from a solid state to a liquid state. The melting temperature may be determined by using a differential scanning calorimeter (DSC) which determines the melting point by measuring the energy input needed to increase the temperature of a sample at a constant rate of temperature change, and wherein the point of maximum energy input determines the melting point of the material being evaluated.

For the purposes of the present invention, the term "softening point" refers to a temperature or range of temperatures at which a material is or becomes shapeable, moldable, formable, deformable, bendable, extrudable, etc. The term softening point may include, but does not necessarily include, the term melting point.

For the purposes of the present invention, the term "$T_s$" refers to the Vicat softening point (also known as the Vicat Hardness). The Vicat softening point is measured as the temperature at which a polymer specimen is penetrated to a depth of 1 mm by a flat-ended needle with a 1 sq. mm circular or square cross-section. A load of 9.81 N is used. Standards for measuring Vicat softening points for thermoplastic resins may include JIS K7206, ASTM D1525 or ISO306, which are incorporated by reference herein.

For the purposes of the present invention, the term "$T_g$" refers to the glass transition temperature. The glass transition temperature is the temperature: (a) below which the physical properties of amorphous materials vary in a manner similar to those of a solid phase (i.e., a glassy state); and (b) above which amorphous materials behave like liquids (i.e., a rubbery state).

For the purposes of the present invention, the term "heat deflection temperature (HDT)" or heat distortion temperature (HDTUL) (collectively referred to hereafter as the "heat distortion index (HDI)") is the temperature at which a polymer deforms under a specified load. HDI is a measure of the resistance of the polymer to deformation by heat and is the temperature (in ° C.) at which deformation of a test sample of the polymer of predetermined size and shape occurs when subjected to a flexural load of a stated amount. HDI may be determined by following the test procedure outlined in ASTM D648, which is herein incorporated by reference. ASTM D648 is a test method which determines the temperature at which an arbitrary deformation occurs when test samples are subjected to a particular set of testing conditions. This test provides a measure of the temperature stability of a material, i.e., the temperature below which the material does not readily deform under a standard load condition. The test sample is loaded in three-point bending device in the edgewise direction. The outer fiber stress used for testing is 1.82 MPa, and the temperature is increased at 2° C./min until the test sample deflects 0.25 mm.

For the purposes of the present invention, the term "melt flow index (MFI)" (also known as the "melt flow rate (MFR)) refers to a measure of the ease of flow of the melt of a thermoplastic polymer, and may be used to determine the ability to process the polymer in thermoforming. MFI may be defined as the weight of polymer (in grams) flowing in 10 minutes through a capillary having a specific diameter and length by a pressure applied via prescribed alternative gravimetric weights for alternative prescribed temperatures. Standards for measuring MFI include ASTM D1238 and ISO 1133, which are herein incorporated by reference. The testing temperature used is 190° C. with a loading weight of 2.16 kg. For thermoforming according to embodiments of the present invention, the MFI of the polymers may be in the range from 0 to about 20 grams per 10 minutes, for example from 0 to about 15 grams per 10 minutes.

For the purposes of the present invention, the terms "viscoelasticity" and "elastic viscosity" refer interchangeably to a property of materials which exhibit both viscous and elastic characteristics when undergoing deformation. Viscous materials resist shear flow and strain linearly with time when a stress is applied, while elastic materials strain instantaneously when stretched and just as quickly return to their original state once the stress is removed. Viscoelastic materials have elements of both of these properties and, as such, exhibit time dependent strain. Whereas elasticity is usually the result of bond stretching along crystallographic planes in an ordered solid, viscoelasticity is the result of the diffusion of atoms or molecules inside of an amorphous material.

For the purposes of the present invention, the term "hydroxy aliphatic acids" refers to organic aliphatic carboxylic acids having a hydroxy group, and which may be used to provide polyhydroxyalkanoates. Hydroxy aliphatic acids useful herein may include lactic acid, hydroxy-beta-butyric acid (also known as hydroxy-3-butyric acid), hydroxy-alpha-butyric acid (also known as hydroxy-2-butyric acid), 3-hydroxypropionic acid, 3-hydroxyvaleric acid, 4-hydroxybutyric acid, 4-hydroxyvaleric acid, 5-hydroxyvaleric acid, 3-hydroxyhexanoic acid, 4-hydroxyhexanoic acid, 6-hydroxyhexanoic acid, hydroxyacetic acid (also known as glycolic acid), lactic acid (also know as hydroxy-alpha-propionic acid), malic acid (also known as hydroxysuccinic acid), etc., and mixtures thereof.

For the purposes of the present invention, the term "polyhydroxyalkanoate (PHA) polymer" refers broadly to renewable, thermoplastic aliphatic polyesters which may be produced by polymerization of the respective monomer hydroxy aliphatic acids (including dimers of the hydroxy aliphatic acids), by bacterial fermentation of starch, sugars, lipids, etc. PHA polymers may include poly-beta-hydroxybutyrate (PHB) (also known as poly-3-hydroxybutyrate), poly-alpha-hydroxybutyrate (also known as poly-2-hydroxybutyrate), poly-3-hydroxypropionate, poly-3-hydroxyvalerate, poly-4-hydroxybutyrate, poly-4-hydroxyvalerate, poly-5-hydroxyvalerate, poly-3-hydroxyhexanoate, poly-4-hydroxyhexanoate, poly-6-hydroxyhexanoate, polyhydroxybutyrate-valerate (PHBV), polyglycolic acid, polylactic acid (PLA), etc., as well as PHA copolymers, blends, mixtures, combinations, etc., of different PHA polymers, etc. PHA may be synthesized by methods disclosed in, for example, U.S. Pat. No. 7,267,794 (Kozaki et al.), issued Sep. 11, 2007; U.S. Pat. No. 7,276,361 (Doi et al.), issued Oct. 2, 2007; U.S. Pat. No. 7,208,535 (Asrar et al.), issued Apr. 24, 2007; U.S. Pat. No. 7,176,349 (Dhugga et al.), issued Feb. 13, 2007; and U.S. Pat. No. 7,025,908 (Williams et al.), issued Apr. 11, 2006, the entire disclosure and contents of the foregoing documents being herein incorporated by reference.

For the purposes of the present invention, the term "polylactic acid or polylactide (PLA)" refers to a renewable, biodegradable, thermoplastic, aliphatic polyester formed from a lactic acid or a source of lactic acid, for example, renewable resources such as corn starch, sugarcane, etc. The term PLA may refer to all stereoisomeric forms of PLA including L- or D-lactides, and racemic mixtures comprising L- and D-lactides. For example, PLA may include D-polylactic acid, L-polylactic acid (also known as PLLA), D,L-polylactic acid, meso-polylactic acid, as well as any combination of D-polylactic acid, L-polylactic acid, D,L-polylactic acid and meso-polylactic acid. PLAs useful herein may have, for example, a number average molecular weight in the range of from about 15,000 and about 300,000. In preparing PLA, bacterial fermentation may be used to produce lactic acid, which may be oligomerized and then catalytically dimerized to provide the monomer for ring-opening polymerization. PLA may be prepared in a high molecular weight form through ring-opening polymerization of the monomer using, for example, a stannous octanoate catalyst, tin(II) chloride, etc.

For the purposes of the present invention, the term "starch-based polymer" refers to a polymer, or combination of polymers, which may be derived from, prepared from, etc., starch. Starch-based polymers which may be used in embodiments of the present invention may include, for example, polylactic acid (PLA), thermoplastic starch (for example, by mixing and heating native or modified starch in the presence of an appropriate high boiling plasticizer, such as glycerin and sorbitol, in a manner such that the starch has little or no crystallinity, a low $T_g$, and very low water, e.g., less than about 5% by weight, for example, less than about 1% water), plant starch (e.g., cornstarch), etc., or combinations thereof. See, for example, starch-based polymers, such as plant starch, disclosed in published PCT Pat App. No. 2003/051981 (Wang et al.), published Jun. 26, 2003, the entire disclosure and contents of which are hereby incorporated by reference, etc.

For the purposes of the present invention, the term "cellulose-based polymer" refers to a polymer, or combination of polymers, which may be derived from, prepared from, etc., cellulose. Cellulose-based polymers which may be used in embodiments of the present invention may include, for example, cellulose esters, such as cellulose formate, cellulose acetate, cellulose diacetate, cellulose propionate, cellulose butyrate, cellulose valerate, mixed cellulose esters, etc., and mixtures thereof.

For the purposes of the present invention, the term "mineral filler" refers to inorganic materials, often in particulate form, which may lower cost (per weight) of the polymer, and which, at lower temperatures, may be used to increase the stiffness and decrease the elongation to break of the polymer, and which, at higher temperatures, may be used to increase the viscosity of the polymer melt. Mineral fillers which may used in embodiments of the present invention may include, for example, talc, calcium chloride, titanium dioxide, clay, synthetic clay, gypsum, calcium carbonate, magnesium carbonate, calcium hydroxide, calcium aluminate, magnesium carbonate mica, silica, alumina, sand, gravel, sandstone, limestone, crushed rock, bauxite, granite, limestone, glass beads, aerogels, xerogels, fly ash, fumed silica, fused silica, tabular alumina, kaolin, microspheres, hollow glass spheres, porous ceramic spheres, ceramic materials, pozzolanic materials, zirconium compounds, xonotlite (a crystalline calcium silicate gel), lightweight expanded clays, perlite, vermiculite, hydrated or unhydrated hydraulic cement particles, pumice, zeolites, exfoliated rock, etc., and mixtures thereof.

For the purposes of the present invention, the term "molded" refers to any method for casting, shaping, forming, extruding, etc., softened or melted polymers, layers, composites, etc., of the present invention.

For the purposes of the present invention, the term "blow molded" refers to a method of molding in which the material is melted and extruded into a hollow tube (also referred to as a parison). This parison may then be captured by closing it into a cooled mold and air is then blown into the parison, thus inflating parison into the shaped article. After the shaped article has cooled sufficiently, the mold is opened and the article is released (e.g., ejected).

For the purposes of the present invention, the term "compression molded" refers to a method of molding in which the molding material, with optional preheating, is first placed in an open, heated mold cavity. The mold is closed with a top force or plug member, pressure is applied to force the material into contact with all mold areas, and heat and pressure are maintained until the molding material has cured.

For the purposes of the present invention, the term "core" refers to that portion of the thermoformable composite which comprises a renewable polymer (or polymers) having an HDI value of up to about 90° C., for example, up to about 60° C. (e.g., up to about 54° C.). In other words, the core comprises renewable polymers which are not resistant to deformation at temperatures of about 90° C. or greater, and may not be resistant to deformation at lower temperatures, for example, about 60° C. or lower (e.g., about 54° C. or lower).

For the purposes of the present invention, the term "heat-resistant layer" refers to a layer of the thermoformable composite which comprises a heat-resistant polymer (or polymers) for imparting heat resistance to the thermoformable composite.

For the purposes of the present invention, the term "heat-resistant polymer" refers to a polymer (or polymers) which has an HDI value of greater than about 50° C., for example greater than about 65° C. (e.g., greater than about 90° C.). In other words, heat-resistant polymers are resistant to deformation at temperatures above about 50° C., for example, above about 65° C. (e.g., above about 90° C.). Heat-resistant polymers may or may not renewable polymers and may include polyolefins (e.g., polyethylene, polypropylene, etc.), polystyrenes, polyesters, polyamides, polyimides, polyurethanes, cellulose-based polymers, such as cellulose propionate, etc., and combinations thereof.

For the purposes of the present invention, the term "CAP layer" (also sometimes known as a "skin" layer) refers to an outer layer which substantially surrounds the core.

For the purposes of the present invention, the term "tie layer" refers to an adhesive layer (e.g., a self-adhesive layer, a thermally meltable adhesive layer, etc.) between two other layers that attaches, adheres, glues, fuses, bonds, etc., these other layers to one another. Tie layers may be used to attach, adhere, glue, fuse, bond, etc., two layers together that are otherwise difficult to adhere together or cannot be adhered to another because of differing compositions, differing coefficients of thermal expansion, differing coefficients of friction or adhesion, etc. For example, a tie layer may be used to attach, adhere, glue, fuse, bond, etc., the outer heat-resistant layer to the core. Suitable tie layers may be comprised of one or more adhesive materials, one or more film-forming thermoplastic polymeric materials, or combinations of adhesive and film-forming thermoplastic polymeric materials. These adhesive materials may include ethyl vinyl acetate (EVA), copolymerized ethylene and methacrylic or acrylic acid, such as Nucrel®, ionomers polymers such as Surlyn®, low density polyethylene (LDPE) treated with maleic anhydride, etc., as well as combinations thereof.

For the purposes of the present invention, the term "substantially surrounds" refers to heat-resistant layer which surrounds at least about 90% of the surface of the core, for example, at least about 95% of the surface of the core. For example, substantially surrounds may include leaving only the ends of core exposed when, for example, the core is positioned between two heat-resistant layers.

For the purposes of the present invention, the term "sheet" refers to webs, strips, films, pages, pieces, segments, etc., which may be continuous in form (e.g., webs) for subsequent subdividing into discrete units, or which may be in the form of discrete units (e.g., pieces).

For the purposes of the present invention, the term "extrusion" refers to a method for shaping, molding, forming, etc., a material by forcing, pressing, pushing, etc., the material through a shaping, forming, etc., device having an orifice, slit, etc., for example, a die, etc. Extrusion may be continuous (producing indefinitely long material) or semi-continuous (producing many short pieces, segments, etc.).

For the purposes of the present invention, the term "coextrusion" and similar terms, such as, for example, "coextruded," refers to refers to the extrusion of multiple layers of material (e.g., polymers) simultaneously. Coextrusion may utilize two or more extruders to melt and deliver a steady volumetric throughput of different molten materials to a single extrusion head which may combine the materials in the desired extruded shape.

For the purposes of the present invention, the term "interpenetrating network" refers to where two adjacent areas, domains, regions, layers, etc., merge, combine, unite, fuse, etc., together so that there is essentially no boundary therebetween.

For the purposes of the present invention, the term "thermoplastic" refers to the conventional meaning of thermoplastic, i.e., a composition, compound, material, etc., that exhibits the property of a material, such as a high polymer, that softens when exposed to sufficient heat and generally returns to its original condition when cooled to room temperature. Thermoplastics may include, but are not limited to, polyesters (e.g., polyhydroxyalkanoates, polyethyleneterephthalate, etc.), poly(vinylchloride), poly(vinyl acetate), polycarbonates, polymethylmethacrylate, cellulose esters, poly(styrene), poly(ethylene), poly(propylene), cyclic olefin polymers, poly(ethylene oxide), nylons, polyurethanes, protein polymers, etc.

For the purposes of the present invention, the term "plasticizer" refers to the conventional meaning of this term as an agent which softens a polymer, thus providing flexibility, durability, etc. Plasticizers may be advantageously used in amounts of, for example, from about 0.01 to about 45% by weight, e.g., from about 3 to about 15% by weight of the polymer, although other concentrations may be used to provide desired flexibility, durability, etc. Plasticizers which may used in embodiments of the present invention include, for example, aliphatic carboxylic acids, aliphatic carboxylic acid metal salts, aliphatic esters, aliphatic amides, alkyl phosphate esters, dialkylether diesters, dialkylether esters, tricarboxylic esters, epoxidized oils and esters, polyesters, polyglycol diesters, alkyl alkylether diesters, aliphatic diesters, alkylether monoesters, citrate ester, dicarboxylic esters, vegetable oils and their derivatives, esters of glycerine, ethers, etc., and mixtures thereof. For example, with starch-based polymers (e.g., plant starch), the plasticizers may include one or more aliphatic acids (e.g., oleic acid, linoleic acid, stearic acid, palmitic acid, adipic acid, lauric acid, myristic acid, linolenic acid, succinic acid, malic acid, cerotic acid, etc.), one or more low molecular weight aliphatic polyesters, one or more aliphatic amides (e.g., oleamide, stearamide, linoleamide, cycle-n-lactam, ε-caprolactam, lauryl lactam, N,N-dibutyl stearamide, N,N-dimethyl oleamide, etc.), one or more aliphatic carboxylic acid esters (e.g., methoxyethyl oleate, diisooctyl sebacate, bis(2-butoxyethyl) adipate, dibenzyl sebacate, isooctyl-isodecyl adipate, butyl epoxy fatty acid ester, epoxidized butyl acetoricinoleate, and low molecule weight (300-1200) poly(1,2-propylene glycol adipate, etc.), one or more aliphatic carboxylic acid metal salts (e.g., magnesium oleate, ferrous oleate, magnesium stearate, ferrous stearate, calcium stearate, zinc stearate, magnesium stearate, zinc stearate pyrrolidone, etc.) See published PCT Pat App. No. 2003/051981 (Wang et al.), published Jun. 26, 2003, the entire disclosure and contents of which are hereby incorporated by reference.

For the purposes of the present invention, the term "compatibilizer" refers to a composition, compound, etc., used to enhance reextrusion of polymer(s), plastic trim, etc., in thermoforming recycle operations by causing what may be two or more dissimilar polymers to provide a homogeneous, or more homogeneous, melt during reextrusion, and to avoid or minimize disassociation when recycled material is added back to the polymer feedstock being extruded. Compatibilizers which may be used in embodiments of the present invention include, for example, polyolefins, polybutadienes, polystyrenes, etc., modified with maleic anhydride, citrates of fatty acids, glycerol esters, etc. The compatibilizer may be advantageously used in amounts from about 0.005 to about 10% by weight, for example from about 0.01 to about 5% by weight of the polymer, although other concentrations may be used so long as they are effective at keeping the two or more polymers miscible and more homogeneous. Maleated polyolefins/polybutadienes/polystyrenes are commercially available compatibilizers, sold by Eastman (EPOLENES®), Crompton (POLYBONDS®), Honeywell (A-C®), and Sartomer (Ricons®). Maleated and epoxidized rubbers, derived from natural rubbers, may also be useful as compatibilizers, for example, maleic anhydride grafted rubber, epoxy/hydroxyl functionalized polybutadiene, etc. Other carboxylic acid modified polyolefin copolymers, such as those from succinic anhydride, may also be used. Monomers such as maleic anhydride, succinic anhydride, etc., may also be added directly along with or without other commercial compatibilizers to prepare in situ compatabilized blends. See U.S. Pat. No. 7,256,223 (Mohanty et al.), issued Aug. 14, 2007, the entire disclosure and contents of which is hereby incorporated by reference. Other useful compatibilizers may include poly(2-alkyl-2-oxazolines), such as, for example, poly(2-ethyl-2-oxazoline) (PEOX), poly(2-propionyl-2-oxazoline), poly(2-phenyl-2-oxazolone), etc. See U.S. Pat. No. 6,632,923 (Zhang et al.), issued Oct. 14, 2003, the entire disclosure and contents of which is hereby incorporated by reference. These compatibilizers may be included singly or as combinations of compatibilizers. For example, with starch-based polymers (e.g., plant starch), the compatibilizers may include one or more products (or complexes) of co-monomers and anhydrides (or their derivatives) at, for example, a 1:1 mole ratio), wherein the co-monomer may include one or more of: acrylonitrile, vinyl acetate, acrylamide, acrylic acid, glutaric acid, methacrylate, styrene, etc., and wherein the anhydride (or derivative) may include one or more of: acetic anhydride, methacrylic acid anhydride, succinic anhydride, maleic anhydride, maleimide, etc. See published PCT Pat App. No. 2003/051981 (Wang et al.), published Jun. 26, 2003, the entire disclosure and contents of which are hereby incorporated by reference.

For the purposes of the present invention, the term "significant weight amount" refers to an amount of the renewable polymer which may be at least about 60% by weight of the composite, for example, at least about 80% by weight, (e.g., at least about 90% by weight) of the composite.

DESCRIPTION

Much work has been done on modifying PLA to survive storage and distribution conditions involving higher temperatures (e.g., above about 140° F. (60° C.)) that may cause deformation of articles comprising PLA due to gravity, residual mold stress, etc. Modification methods have included the addition of mineral fillers (talc, calcium carbonate, or nanoclay) to PLA or small amounts of fossil fuel resins and adjuvants. These methods may improve the performance of the PLA-containing articles in heat distortion test apparatus, but may also do little to improve the performance of these articles during higher temperature storage or transportation. The use of additives with the PLA may be ineffective where the overall blend has PLA as a continuous phase. The mechanical strength of the PLA articles under slow temperature changes and small strain rates may be dominated by the strength of the continuous phase. While heat distortion temperature may be a widely used analysis method throughout the plastics industry, it has different mechanical conditions which may not be relevant to the storage condition issue.

In embodiments of the present invention, articles comprising a thermoformable composite are provided which comprise: a core and a heat-resistant outer layer substantially surrounding the core. The core comprises a renewable polymer having: (a) a $T_s$ value of up to about 90° C. (e.g., in the range of from about 400 to about 90° C.); (b) a heat distortion index of up to about 90° C. (e.g., up to about 60° C., for example, up to about 54° C.); and (c) optionally, a $T_m$ in the range of from about 40° to about 250° C. (e.g., in the range of from about 90° to about 190° C.). The outer heat-resistant layer comprises a heat-resistant polymer having: (a) a $T_s$ value of greater than about 60° C. (e.g., greater than about 75° C., for example, greater than about 100° C.); (b) a heat distortion index of greater than about 50° C. (e.g., greater than about 65° C., for example, greater than about 90° C.); and (c) optionally, a $T_m$ greater than about 60° C. (e.g., greater than about 100° C., for example, greater than about 150° C.); (b). The $T_s$ value, heat distortion index (and optionally $T_m$) of the heat-resistant polymer is also greater than that of the renewable polymer, for example, the heat-resistant polymer has a $T_s$ value, heat distortion index (and optionally $T_m$) at least about 5° C. greater (e.g., at least about 10° C. greater) than that of the renewable polymer. The renewable polymer comprises at least about 60% by weight (e.g., at least about 80% by weight, for example, at least about 90% by weight) of the composite. Such articles provide the ability to resist deformation during higher temperature conditions that may occur during storage and distribution.

Embodiments of the present invention may include the use of laminar or laminated composite structures wherein the core comprises renewable PHAs, such of PLA, and wherein the outer layer comprises heat-resistant polymers such as polystyrene, polypropylene, etc., to make a high temperature deformation-resistant thermoformed article. One embodiment may comprise a laminate composite structure formed with an upper (first) layer of a heat-resistant polymer, a middle (core) of PLA, and a bottom or lower (second) layer of a heat-resistant polymer. The overall PLA content of the composite structure may be very high, e.g., at least about 80% by weight of the composite structure. For example, 90% PLA content may be obtained by making a thermoformable structure which comprises 1 mil thick upper (first) layer of heat-resistant polymer, 20 mil thick middle (core) of PLA, and 1 mil thick bottom or lower (second) layer of heat-resistant polymer. At temperatures above those encountered in transportation such as, for example, about 150° F. (65.6° C.) or higher, the heat-resistant polymer-containing layers would provide enough strength for the article to resist distribution and storage stresses, even though the PLA core may have lost its mechanical strength. When the higher temperature condition is removed, the PLA may regain its original strength without deformation.

In one embodiment of the present invention, the core may comprise a combination of renewable starch-based polymers with other materials, e.g., one or more plasticizers, one or more compatibilizers, one or more other polymers, etc. For example, the core may comprise from about 20% to about 95% by weight of a combination comprising at least about 60% by weight (e.g., from about 65 to about 95% by weight) plant starch, and up to about 40% other materials, for example, from about 1 to about 15% by weight plasticizer (such as those previously described for starch-based polymers), from about 0.1 to about 5% by weight compatibilizer (such as those previously described for starch-based polymers), and from about 1 to about 20% by weight biodegradable polymer other than plant starch (such as polylactic acid and polyhydroxybutyrate-valerate). Useful combinations of this type may include Plastarch Materials (PSM), such as HL-102 series granular material, made by Wu Han Hua Li Environment Protection Science & Technology Co., Ltd., of Wu Han Optic Valley, China), and which are disclosed in published PCT Pat App. No. 2003/051981 (Wang et al.), published Jun. 26, 2003, the entire disclosure and contents of which are hereby incorporated by reference.

One embodiment of the present invention may be a thermoformed article such as a food or beverage cup, lid, cutlery item, foodservice item, molded tray, food storage container, etc. Another embodiment of the present invention may be an article in the form of a thermoformed sheet comprising a core of renewable polymer between two layers comprising a heat-resistant polymer. Another embodiment of the present invention may be an article wherein the core comprising a renewable polymer may be blended with other non-renewable polymers. Another embodiment of the present invention may be an article wherein the core comprises a renewable polyhydroxyalkanoate polymer which may contain chain branching moieties or wherein the core comprises other additives, such as plasticizers, compatibilizers, etc., to change the properties of the core. Another embodiment of the present invention may be an article wherein the one or more of the core or outer layers may comprise one or more mineral fillers, for example, talc, calcium chloride, titanium dioxide, clay, etc., or mixtures thereof.

In embodiments of the present invention, a thermoformable composite may be provided by coextruding a heat-resistant polymer having the above defined $T_g$, heat distortion index, and optional $T_m$ values, and renewable polymer having the above defined $T_g$, heat distortion index and optional $T_m$ values, wherein the renewable polymer in the core comprises a significant weight amount of the composite (for example, at least about 80% by weight), and wherein the heat-resistant polymer forms an outer layer which substantially surrounds the core (for example, at least about 90% of the surface area of the core, such as at least about 95% of the surface area of the core). Articles such as, for example, a food or beverage cup, lid, cutlery item, foodservice item, molded tray, food storage container, etc., may then thermoformed from the composite structure.

Another embodiment of the present invention may be an article wherein the core or one or more outer layers may comprise a compatibilizer which enhances reextrusion of polymer or plastic trim pieces obtained during trimming of the article which may be used in thermoforming recycle operations. Another embodiment of the present invention may be an article formed by compression molding or blow molding the thermoformable composite. Another embodiment of the present invention may be an article formed from a coextruded sheet from a roll fed through thermoforming operation, for example, with inline extrusion and thermoforming with recycle of trimmed polymer or plastic for regrinding.

Referring to the drawings, an embodiment an article comprising a thermoformable laminate composite according to the present invention is illustrated in FIG. 1 in the form of, for example, a beverage lid, indicated as 100. Beverage lid 100 comprises an outer rim portion, indicated as 104, a center portion, indicated as 108, and a main body portion, indicated as 112, connecting center portion 108 and rim portion 104.

FIG. 2 is a sectional view of the beverage lid 100 to illustrate the composition of the various layers and core comprising a thermoformable laminate composite. As shown in FIG. 2, the thermoformable laminate composite comprises a thicker core 204 comprising a renewable polymer, for example, a polyhydroxyalkanoate polymer, such as polylactic acid (PLA), a starch-based polymer, a cellulose-based polymer, etc., plus any other optional components such as plasticizers, compatibilizers, etc. Core 204 is positioned between a first upper heat-resistant layer 208 comprising a heat-resistant polymer, such as polystyrene, polypropylene, cellulose propionate, etc., and a second lower or bottom heat-resistant layer 212 which also comprises a heat-resistant polymer which may be the same or different from the heat-resistant polymer in first layer 204. The upper interface, indicated as 216, between first layer 208 and core 204, may be a distinct interface between layer 208 and core 204, or may comprise an interpenetrating network of layer 208 and core 204, may include a tie layer between layer 208 and core 204, etc. Similarly, the lower interface, indicated as 220, between second layer 212 and core 204, may be a distinct interface between layer 212 and core 204, or may comprise an interpenetrating network of layer 212 and core 204, may include a tie layer between layer 212 and core 204, etc.

An embodiment of the method of the present invention for preparing a thermoformed article is further schematically illustrated in FIG. 3 which shows thermoforming system, indicated generally as 300. In system 300, pellets of a renewable polymer such as PLA, are added, as indicated by arrow 304, to a core extruder, indicated as 308. Similarly, pellets of a heat resistant polymer, such as polystyrene, polypropylene, etc., are added, as indicated by arrow 312, to an outer (CAP) layer extruder, indicated as 316. Core extruder 308 provides an extruded core, indicated by arrow 320, while CAP layer extruder 312 provides an extruded CAP layer, indicated by arrow 324. Core 320 and CAP layer 324 are combined in a coextruder, indicated as 328, and may be coextruded at a temperature in the range of, for example, from about 155° to about 300° C. (e.g., from about 200° to about 225° C.). In coextruder 328, CAP layer 324 surrounds core 320 to provide a hot coextruded laminate, indicated as 332.

Hot laminate 332 passes through a series chill rolls, indicated generally as 336, to lower to the temperature of the laminate to provide cold web laminate composite, indicated as 340 to, for example, in the range of from about 25° to about 150° C. (e.g., from about 60° to about 75° C.). Cold laminate composite web 340 passes through a remelt oven, indicated as generally 344, where cold laminate composite web 340 is softened or melted at a temperature, for example, in the range of from about 100° to about 200° C. (e.g., from about 120° to about 180° C.), to provide a thermoformable laminate composite web, indicated generally as 348. Thermoformable laminate composite web 348 is passed through a thermoforming or molding section at a temperature, for example, in the range of from about 25° to about 75° C. (e.g., from about 26° to about 40° C.), indicated generally as 352, to provide a thermoformed or molded articles, of three are schematically shown and indicated as 356-1, 356-2 and 356-3. Thermoformed article 356-2 is shown as passing through a trimmer press 358 for remove excess material (e.g., flashing) to provide finished article 356-3, which may then exits system 300, as indicated by arrow 360.

The trimmed material from article 356-2 many be recycled, as indicated by arrow 364. Recycled material 364 is sent to a chopper or grinder, indicated as 368, to provide size reduced recycled material. The size reduced recycled material is then returned, as indicated by arrow 372 for blending with PLA pellets in core extruder 308.

It should be appreciated that the embodiments illustrated in FIGS. 1 to 3 are provided to illustrate the teachings of the present invention. Alterations or modifications within the skill of the art of the embodiments in FIGS. 1 to 3 are considered within the scope of the present invention, so long as these alterations or modifications operate in a same or similar manner, function, etc.

Examples

General formulations of core polymers are shown in the following Table 1:

TABLE 1

| General Formulation No. | PSM[1] | PP[2] | Tenite[3] | PLA/MPLA[4] |
| --- | --- | --- | --- | --- |
| 1 | 90-95% | 5-10% | 0% | 0% |
| 2 | 90-95% | 0% | 5-10% | 0% |

TABLE 1-continued

| General Formulation No. | PSM[1] | PP[2] | Tenite[3] | PLA/MPLA[4] |
|---|---|---|---|---|
| 3 | 80-90% | 5-10% | 5-10% | 0% |
| 4[5] | 20-52% | 0% | 23-37% | 24-50% |

[1]Plastarch Materials: starch-based resin comprising plant starch, plasticizer, compatibilizer and biodegradable polymer made by Wu Han Hua Li Environment Protection Science & Technology Co., Ltd., of Wu Han Optic Valley, China. PSM comprises 100% biodegradable materials and greater than about 95% biobased (renewable) materials. PSM may be processed at temperatures in the range of, for example, from about 155° to about 210° C.
[2]Polypropylene (extrusion grade)
[3]Cellulose propionate (from Eastman Chemicals)
[4]PLA: polylactic acid; MPLA: maleic anhydride modified PLA, which is used as a compatibilizer for blends of PLA and PSM. Ratio PLA:MPLA may be in range of from about 100:0.2 to about 1:2.
[5]Total renewable polymer in the range of from about 60 to about 88% by weight.

The general formulations shown in Table 1 are prepared by feeding mixtures of resin pellets for each listed polymer (within the percentages indicated) into a single or twin extruder and extruded at temperatures in the range of, for example, from about 155° to about 210° C. Outer skin layers (i.e., upper and lower CAP layers) are also prepared by coextrusion of polystyrene (Chevron MC3100), polypropylene and/or Tenite with the core. Cores prepared from general formulations nos. 1-4 may have thicknesses of in the range of from about 12 to about 18 mils. For general formulation no. 1, skin layers of polypropylene may be prepared having thicknesses of in the range of from about 1 to about 5 mils. For general formulation no. 2, skin layers of polypropylene or Tenite may be prepared having thicknesses of in the range of from about 1 to about 5 mils. For general formulation no. 3, skin layers of polypropylene may be prepared having thicknesses of in the range of from about 1 to about 5 mils. For general formulation no. 4, skin layers of polystyrene, polypropylene or Tenite are prepared having thicknesses of in the range of from about 1 to about 5 mils.

All documents, patents, journal articles and other materials cited in the present application are hereby incorporated by reference.

Although the present invention has been fully described in conjunction with several embodiments thereof with reference to the accompanying drawings, it is to be understood that various changes and modifications may be apparent to those skilled in the art. Such changes and modifications are to be understood as included within the scope of the present invention as defined by the appended claims, unless they depart therefrom.

What is claimed is:

1. An article comprising a thermoformable composite comprising:
   a core comprising a renewable polymer having: (a) a $T_s$ value of up to about 90° C.; and (b) a heat distortion index of up to about 90° C.; and
   a heat-resistant outer layer surrounding the core, the heat-resistant outer layer having a first and a second layer and the core being positioned between the first and second layers and wherein an interface is formed between the core and each of the first and second layers and wherein one or more of the interfaces provides an interpenetrating network and the heat-resistant outer layer further comprising a heat-resistant polymer having: (a) a $T_s$ value of greater than about 60° C.; and (b) a heat distortion index of greater than about 50° C.;
   wherein the renewable polymer comprises at least about 60% by weight of the composite;
   wherein the heat-resistant polymer has a $T_s$ value and heat distortion index greater than that of the renewable polymer.

2. The article of claim 1, wherein the renewable polymer comprises a polyhydroxyalkanoate polymer, a polycaprolactone polymer, a starch-based polymer, a cellulose-based polymer, or combination thereof.

3. The article of claim 2, wherein the renewable polymer comprises a polyhydroxyalkanoate polymer.

4. The article of claim 3, wherein the polyhydroxyalkanoate polymer comprises one or more of poly-beta-hydroxybutyrate poly-alpha-hydroxybutyrate poly-3-hydroxypropionate, poly-3-hydroxyvalerate, poly-4-hydroxybutyrate, poly-4-hydroxyvalerate, poly-5-hydroxyvalerate, poly-3-hydroxyhexanoate, poly-4-hydroxyhexanoate, poly-6-hydroxyhexanoate, polyhydroxybutyrate-valerate polyglycolic acid, or polylactic acid.

5. The article of claim 4, wherein the polyhydroxyalkanoate polymer comprises polylactic acid.

6. The article of claim 5, wherein the polylactic acid has a number average molecular weight in the range of from about 15,000 and about 300,000.

7. The article of claim 1 wherein the renewable polymer comprises a starch-based polymer, or a combination of a starch-based polymer and a polyhydroxyalkanoate polymer.

8. The article of claim 1, which is in the form of a food or beverage cup, lid, cutlery item, foodservice item, molded tray, or food storage container.

9. The article of claim 8, which is in the form of a beverage lid.

10. The article of claim 1, wherein the core further comprises a plasticizer in an amount of from about 0.01 to about 45% by weight of the core.

11. The article of claim 10, wherein the core further comprises a compatibilizer in an amount of from about 0.005 to about 10% by weight of the core.

12. The article of claim 1, wherein the renewable polymer comprises at least about 80% by weight of the composite.

13. The article of claim 12, wherein the renewable polymer comprises at least about 90% by weight of the composite.

14. The article of claim 1, wherein the renewable polymer has a $T_s$ value of in the range of from about 40° to about 90° C.

15. The article of claim 14, wherein the renewable polymer has a heat distortion index of up to about 60° C.

16. The article of claim 14, wherein the renewable polymer has a $T_m$ in the range of from about 40° to about 250° C.

17. The article of claim 14, wherein the heat-resistant polymer has a $T_s$ value greater than about 75° C.; and a heat distortion index greater than about 65° C.

18. The article of claim 17, where the heat-resistant polymer comprises a polyolefin, a polystyrene, a polyester, a polyamide, a polyimide, a polyurethane, a cellulose-based polymer, or combination thereof.

19. The article of claim 18, wherein the heat-resistant polymer comprises a polystyrene, a polypropylene, a cellulose propionate, or combination thereof.

20. The article of claim 18 wherein the $T_s$ value and heat distortion index of the heat-resistant polymer is at least about 5° C. greater than that of the renewable polymer.

21. The article of claim 20 wherein the $T_s$ value and heat distortion index of the heat-resistant polymer is at least about 10° C. greater than that of the renewable polymer.

22. The article of claim 1, wherein the core comprises a combination comprising, by weight of the combination, of from about 65 to about 95% a plant starch, from about 1 to about 15% plasticizer, from about 0.1 to about 5% compatibilizer, and from about 1 to about 20% biodegradable polymer other than plant starch.

23. A method comprising the following steps:
(1) providing a renewable polymer having: (a) a $T_s$ value of up to about 90° C.; and (b) a heat distortion index of up to about 90° C.;
(2) providing a heat-resistant polymer having: (a) a $T_s$ of greater than about 60° C., and (b) a heat distortion index greater than about 50° C., wherein the $T_s$ value and heat distortion index of the heat-resistant polymer is greater than that of the renewable polymer; and
(3) coextruding the heat-resistant polymer and the renewable polymer to provide a thermoformable composite comprising:
a core comprising the renewable polymer, wherein the renewable polymer comprises at least about 60% by weight of the composite; and
a heat-resistant outer layer comprising the heat-resistant polymer which substantially surrounds the core and wherein the heat-resistant outer layer having a first and a second layer and the core being positioned between the first and second layers and wherein an interface is formed between the core and each of the first and second layers and wherein one or more of the interfaces provides an interpenetrating network.

24. The method of claim 23, wherein step (3) is carried out so that the heat-resistant layer surrounds at least about 90% of the surface of the core.

25. The method of claim 23, wherein step (3) is carried out a temperature in the range of from about 155° to about 300° C.

26. The method of claim 23, which comprises the further step (4) of lowering the temperature of composite after step (3) to provide a cold composite web.

27. The method of claim 26, wherein the cold composite web is lowered to a temperature in the range of from about 25° to about 150° C.

28. The method of claim 26, which comprises the further steps of:
(5) softening or melting the cold composite web to provide a thermoformable composite web; and
(6) passing the thermoformable composite web through a thermoforming section to provide a thermoformed article.

29. The method of claim 28, wherein the cold composite web is softened or melted during step (5) at a temperature in the range from about 100° to about 200° C., and wherein the thermoformable composite web is passed through the thermoforming section during step (6) at a temperature in the range from about 25° to about 75° C.

30. The method of claim 28, which comprises the further steps of:
(7) removing excess material from the thermoformed article; and
(8) recycling the removed excess material.

31. The method of claim 23, wherein the renewable polymer of step (1) comprises a polyhydroxyalkanoate polymer, a polycaprolactone polymer, a starch-based polymer, a cellulose-based polymer, or combination thereof.

32. The method of claim 31, wherein the renewable polymer of step (1) comprises a polyhydroxyalkanoate polymer.

33. The method of claim 31, wherein the renewable polymer of step (1) comprises a starch-based polymer, or a combination of a starch-based polymer and a polyhydroxyalkanoate polymer.

34. The method of claim 31, wherein the renewable polymer comprises at least about 80% by weight of the composite of step (3).

35. The method of claim 34, wherein the renewable polymer comprises at least about 90% by weight of the composite of step (3).

36. The method of claim 23, wherein the renewable polymer of step (1) and the heat-resistant polymer of step (2) have a melt flow index in the range of from 0 to about 20 grams per 10 minutes.

37. The method of claim 36, wherein the renewable polymer of step (1) and the heat-resistant polymer of step (2) have a melt flow index in the range of from 0 to about 15 grams per 10 minutes.

38. The method of claim 23, wherein the step (3) provides extruded first and second outer layers and wherein the extruded core is positioned between the extruded first and second outer layers.

* * * * *